(12) United States Patent
Roers

(10) Patent No.: US 8,864,499 B2
(45) Date of Patent: *Oct. 21, 2014

(54) STUDENT PROFILE GRADING SYSTEM

(71) Applicant: Patrick G. Roers, Scottsdale, AZ (US)

(72) Inventor: Patrick G. Roers, Scottsdale, AZ (US)

( * ) Notice: Subject to any disclaimer, the term of this patent is extended or adjusted under 35 U.S.C. 154(b) by 113 days.

This patent is subject to a terminal disclaimer.

(21) Appl. No.: 13/890,691

(22) Filed: May 9, 2013

(65) Prior Publication Data

US 2013/0244219 A1    Sep. 19, 2013

Related U.S. Application Data

(63) Continuation of application No. 12/038,952, filed on Feb. 28, 2008, now Pat. No. 8,465,288.

(60) Provisional application No. 60/891,962, filed on Feb. 28, 2007.

(51) Int. Cl.
*G09B 7/00* (2006.01)
*G09B 7/08* (2006.01)

(52) U.S. Cl.
CPC ... *G09B 7/00* (2013.01); *G09B 7/08* (2013.01)
USPC .......................... 434/323; 434/322; 434/350

(58) Field of Classification Search
USPC .......................................... 434/236, 350, 353
See application file for complete search history.

(56) References Cited

U.S. PATENT DOCUMENTS

| | | | |
|---|---|---|---|
| 4,715,011 A | 12/1987 | Brittan | |
| 4,770,636 A * | 9/1988 | Buschke | 434/236 |
| 5,059,127 A | 10/1991 | Lewis et al. | |
| 5,135,399 A * | 8/1992 | Ryan | 434/236 |
| 5,267,865 A | 12/1993 | Lee et al. | |
| 5,810,605 A * | 9/1998 | Siefert | 434/362 |
| 6,146,148 A | 11/2000 | Stuppy et al. | |
| 6,546,230 B1 | 4/2003 | Allison | |
| 6,651,071 B1 | 11/2003 | Obrien et al. | |
| 6,729,885 B2 | 5/2004 | Stuppy et al. | |
| 6,760,748 B1 | 7/2004 | Hakim | |
| 6,974,328 B2 | 12/2005 | Aspe et al. | |
| 7,266,340 B2 | 9/2007 | Bresciani | |
| 7,837,472 B1 * | 11/2010 | Elsmore et al. | 434/236 |
| 7,873,638 B2 | 1/2011 | Young et al. | |
| 2002/0098468 A1 | 7/2002 | Barrett et al. | |
| 2003/0017442 A1 | 1/2003 | Tudor et al. | |
| 2003/0049593 A1 | 3/2003 | Parmer et al. | |
| 2003/0198930 A1 | 10/2003 | Stuppy | |

(Continued)

OTHER PUBLICATIONS

Arriaga et al.,"Evaluation of Fuzzy Intelligent Learning Systems," Recent Research Development in Learning Technologies (2005).

(Continued)

*Primary Examiner* — Robert J Utama
*Assistant Examiner* — Sadaruz Zaman
(74) *Attorney, Agent, or Firm* — The Noblitt Group, PLLC

(57) ABSTRACT

The invention relates to a method and means of grading students. This invention is a software application utilizing profiling techniques that when combined or imbedded with available knowledge on the human learning experience will individually evaluate each student based on their current ability and capacity to learn, by subject. Student's tests are graded electronically against their personal ability and capability profile for grade. The profile system software is applicable to many learning situations requiring a measured outcome.

21 Claims, 7 Drawing Sheets

(56) References Cited

U.S. PATENT DOCUMENTS

| | | |
|---|---|---|
| 2004/0219504 A1 | 11/2004 | Hattie |
| 2006/0106667 A1* | 5/2006 | Coyne ............................. 705/10 |
| 2006/0154226 A1 | 7/2006 | Maxfield |
| 2008/0038708 A1 | 2/2008 | Slivka et al. |
| 2008/0166693 A1 | 7/2008 | Gifford et al. |
| 2009/0181356 A1* | 7/2009 | Dasgupta ..................... 434/362 |
| 2009/0291426 A1* | 11/2009 | Polivka ......................... 434/350 |
| 2011/0039246 A1* | 2/2011 | Packard et al. .............. 434/362 |

OTHER PUBLICATIONS

Xu et al., "Intelligent Student Profiling with Fuzzy Models," Proceedings of the 35th Hawaii International Conference on System Sciences, IEEE, 2002.

* cited by examiner

Teacher Curriculum Module

STUDENT PROFILE GRADING SYSTEM

CROSS-REFERENCES TO RELATED APPLICATIONS

This application is a continuation of U.S. patent application Ser. No. 12/038,952, filed on Feb. 28, 2008, which claims the benefit of U.S. Provisional Patent Application No. 60/891,962, filed on Feb. 28, 2007, and incorporates the disclosure of each application in its entirety by reference. To the extent that the present disclosure conflicts with any referenced application, however, the present disclosure is to be given priority.

STATEMENT REGARDING FEDERALLY SPONSORED RESEARCH OR DEVELOPMENT

Not applicable,

REFERENCE TO SEQUENCE LISTING A TABLE, OR COMPUTER PROGRAM LISTING

Not applicable.

BACKGROUND OF THE INVENTION (1) Field of the Invention

This application is directed to methods of determining student performance by comparison to the innate and cognitive capability of students as measured by various tests. In particular, it is related to establishing a gracing system whereby the student's grade is based on the student's own individual capacity and capability.

(2) Description of Related Art

The methods of grading students, particularly through the public education system utilizes disparate standards such as 'curve' grading based on the comparative efforts of others within the same learning environment or grades as determined by an instructor or teacher. Such grades may be based on an arbitrary standard based on the individual teacher's philosophical view of grading. Government entities, local school superintendents, districts, school boards, etc. mandate other standards which contribute to the confusion, and lack of relevancy, in determining an individual's scholastic abilities. Historically, students have been graded on the ability to memorize information because prior to the current proliferation of information, all that a student left school with was what they could remember.

Currently, students have access to a large amount of information from a wide variety of sources which now include the internet and other digital sources, thus requiring a change in the criteria for learning.

There exists a need for a change in the direction of education, at least in part, where the goal is the utilization of information and the assimilation of ideas. Such a change will allow for the individualization of education that will provide for the particular interests, capabilities, and needs of the student. Consequently, there is a need for a grading system that is related to that goal where the testing is based on the student's innate and cognitive abilities, so that progress is directed toward improving the student's abilities in the area of utilization of information and assimilation of ideas. This will set a benchmark for testing based on the student's ability rather than an arbitrary or dissimilar comparison.

Other's have sought to keep track of students progress toward achieving educational goals without the use of a grade by utilizing software to track students progress toward mastering educational material. For example, U.S. Pat. No. 6,651,071 describes the use of a data base where a student's progress against a plurality of abilities is tracked in order to receive a degree. A user interface is provided to selectively present information from the portfolio in a plurality of formats, thereby enabling a student or a faculty member to evaluate the students progress toward mastering the abilities and associated knowledge in order to make informed plans for improvement. Though there is peer and self assessment, there is no measurement of how well the student has performed against the student's innate and cognitive abilities, that is, against what the student is capable of doing.

It is common to grade on the curve, that is, to average test scores on a class and award grades to students based on the average test scores. For example, U.S. Pat. No. 4,715,011 describes a calculator to facilitate an easy method of performing the calculations to rapidly assign letter grades to students. This method, though very common, does not measure the student's performance against the student's innate and cognitive abilities, that is, against what the student is capable of doing, U.S. Pat. No. 6,760,748 mentions grading various aspects of student performance to selectable curves by use of student terminals, teachers terminals, and a computer based system. The performance may include assessments of attendance, class performance, homework performance, or the assignment of grades, and include equipment for directly transmitting student grades to administrative databases via a network. Though a computerized system is attractive for monitoring, student's progress, there exists a need in the art for a system which a student is measured against innate and cognitive capabilities.

US Patent Application Publication No. 20080038708 by Slivka et al. discloses a method for creating an adaptive and customized educational environment. Though this application discloses a computerized system for collecting information and performing various statistical analysis of students, it does not disclose a method of grading a student against a personal standard. A student profile is created for the purpose of learning style, not for a grading method.

Similarly, US Patent Application Publication No. 20060154226 by Maxfield discloses a personalized learning process where student progress is tracked and monitored by a computer system. The methods disclosed are primarily concerned with adaptability and creating the most effective learning environment for the student. A grading system related to the student's innate and cognitive capabilities is not disclosed.

BRIEF SUMMARY OF THE INVENTION

The present invention is a software based method by which a student is profiled according, to various psychological, sociological, or educational factors and the grades received for curriculum tests are structured in a relationship to that profile. The overall goal is to measure student performance to the student's innate and cognitive abilities on a particular subject.

BRIEF DESCRIPTION OF THE SEVERAL VIEWS OF THE DRAWING(S)

DETAILED DESCRIPTION OF THE INVENTION

Figure 1:
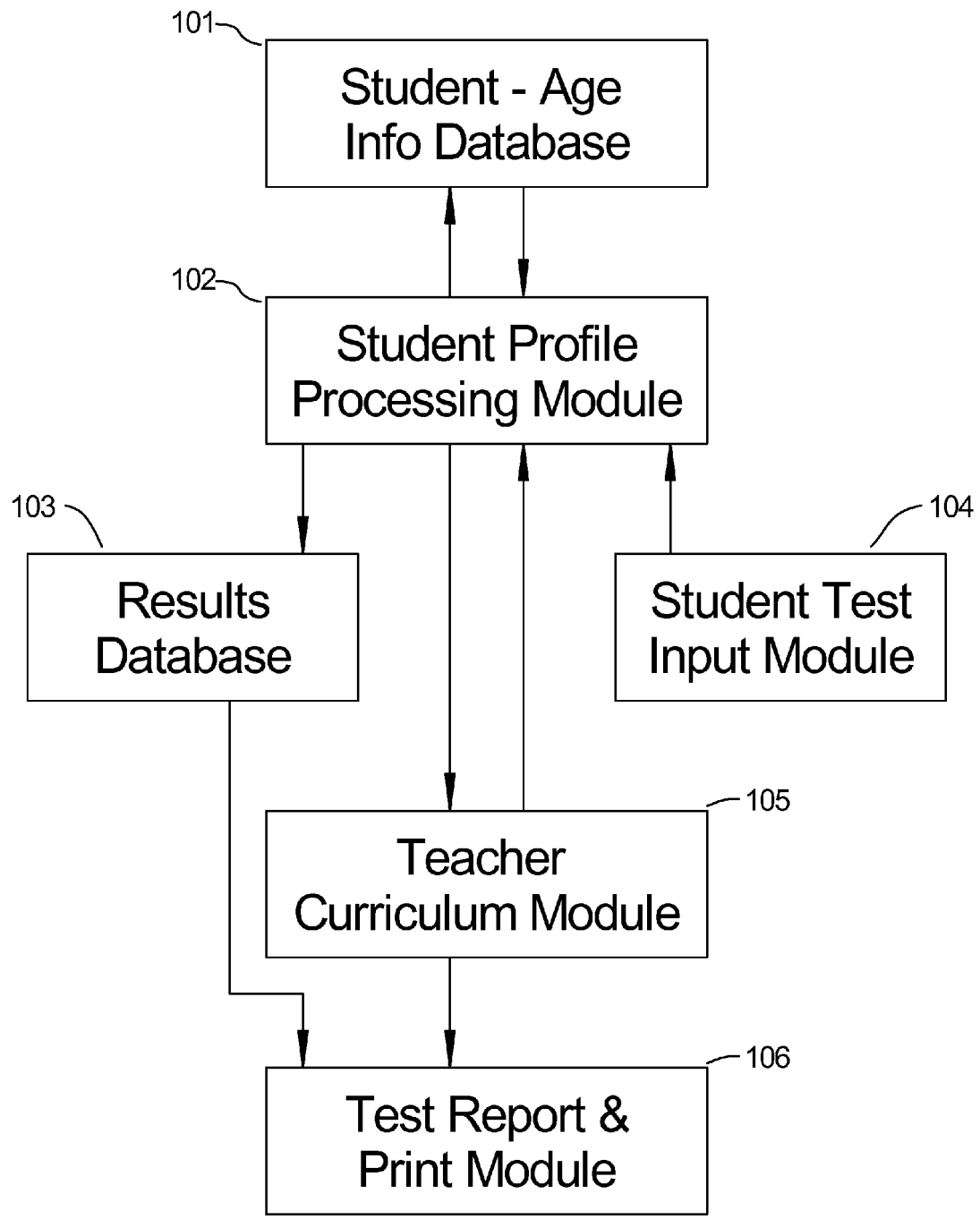
FIG. 1 shows a method of how the student profiled grading system modules interact.

Current educational methods are directed toward memorization and mastery of material, i.e. intelligence, as the key to education. Grading systems have historically been set up to measure a students mastery of the material and favor students with the ability to recall and memorize the coursework material.

With the improvements of readily available information in society, the future goal of education will need to be re-directed to intellect as the basis for learning. That is, the ability to assimilate and utilize information. Consequently, the grading, system will have to be re-directed so the student's intellectual ability can be monitored and improved. That is the student's ability to assimilate and utilize information will have to be measured.

The present invention is directed to the core of our education system b establishing a standard of measurement based on individual student ability, rather than the current standards which have been criticized as arbitrary by some.

It is important that the grading system is based not only on how well a student did on answering questions on a test, but also how well the student did against what would be expected based on the students innate and cognitive abilities profile. Such a system will provide feedback to the student and teacher as to the effect of teaching and learning based on the student's capability in each subject being taught.

Utilizing the computer, an educational profiling software may be created that will allow for the recognition of students who exceed the norm for their age group on a national bases by subject. Also, a more relational learning environment may also be utilized which has proven highly effective.

This invention relates to changing the testing function which is interpreted to be the measurable outcome of learning efforts and effectiveness as determined by a grading system. The object of the present invention is the measurement of grading is based on the individual student's ability by subject as an alternative to current methods such as grading by a curve, teacher philosophy, school standards, statewide mandates, etc.

The effect of this invention will be to redirect the current method of grading and teaching toward that end.

According to the present invention, the most practical way to monitor a students intellectual progress in an educational environment is to establish a test reference base where the student's innate and cognitive intellectual capabilities are characterized. The characterization can be performed by suitable testing that includes important psychological, sociological, and educational factors which pertain to human learning. The testing information resides in a computerized software database. The database can be used in methodology for determining a student's grade for a particular curriculum test.

Potential benefits of the present invention are:
1. Eliminates the current perceived pier-to-pier grading system. There would no longer be competition for grades among students. Students will be challenged against their own personal ability.
2. A student could fail if not performing to their capability.
3. Achievement is determined by a student's progress/capability quotient.
4. Allows the education system to teach and monitor each individual student based on his or her own aptitude for learning by subject.
5. Works with our current education structure of class presentations
6. Provides a more relevant education,
7. Individual progress may be innately determined.
8. Promotes a more interactive teaching environment.
9. Attendance and tests relative to each student's 'ability coefficient' is the only requirement getting a high school diploma. It is the same as present system; however, schools may include other criteria for graduation
10. Removes the pressures and stigmas associated with having to compete with others under dissimilar competitive standards.
11. Provides a frequently updated individual core profile. The profile is not available, i.e. is secured, and is used only for the establishment of a benchmark for testing.
12. Personal profile is based on factors that affect learning, including among other things:
    a. aptitude
    b. age
    c. gender
    d. psychological attitude for learning
    e. sociological considerations
    f. any ethnic or social background considerations
    g. educational factors and background
13. Provides teacher information relating to individual comprehension. Provides a grade of achievement relative to ability.
14. Provides the teacher on the type of class instructional scope needed based on individual class requirements.
15. Provides the teacher and administrator with feedback on teacher effectiveness.
16. Provides administrative information on teaching effectiveness of the entire school.
17. The system works with any type of school structure, such as home, private, and public.
18. Assist higher education with a better prepared student.

FIG. 1 is a detailed view of the various data bases and modules of the present invention that interact to provide the student profiled grading system. A Student—Age Information Database 101 provides for test information on.
1. Each subject being taught
2. Overlapping previous and next performance levels The basic information that is tested against is at least large enough to encompass the age-appropriate curriculum. This database of information provides the subject scope that the student is tested against.

The teacher wishing to include additional information that they are working on and which will become a permanent part of the system can add to this database. This database will also contain data used to check reliability and validity of the system. This will be based on Fuzzy Logic Modeling using various statistical methods.

A Student Profile Processing Module 102 establishes the innate and cognizant ability of each student. Preferably, it is revalidated at least three times a year. The reliability is checked on each given test. All tests are graded against: this base. It is the main processing module between tests and data. It is used:
a) To establish the innate and cognizant ability of each student.
b) To contain validation criteria,
c) To provide for Reliability checking,
d) To establish the base from which all tests are graded, and
e) To utilize algorithmic functions based on a fuzzy logic model, or other statistical modeling, for grading purposes.

The Student Profile Processing Module 102 is the core module that draws from the data base information as required to determine grading. The results of this grading will be stored in the individual student database.

A Results Database 103 stores all individual student test results and grade information which may include information such as:
a) Class information on overall comprehension
b) Individual teacher scoring on class comprehension by test
c) Any re-training and re-testing information by class and teacher
d) Progressive and cumulative information on all tests taken A Student Test Input Module 104 is an input data base which has student input from validation tests. The tests are normally tests from course work. Typical information included in the database would be:
a) Student input, from validation tests
b) Student tests from course work
c) Automatic compilation information from periodic tests This module might include a scanning conversion module that may additionally contain student validity checking information. The scanning module may directly read in student tests to simplify testing and grading.

In a preferred embodiment, there will be at least three broad based tests given each year to establish and update the student's profile. Changes will also be made from the periodic testing to determine progress.

A Teacher Curriculum Module 105 is the course curriculum which is input by the teacher and may be adjusted as needed. The teacher establishes the teaching timeline based on the classroom progress, individual student progress, and other factors. The teacher also establishes tests based on the presented material. This input module will allow the teacher to input curriculum pertinent to an expanded or changed teaching syllabus. This module is how a course curriculum is added to database. This module also provides for an automated test makeup based on selected range or criterion when a test has been missed or failed.

A Test Report and Print Module 106 prints individual test from the teacher curriculum module. It calculates and assigns grades based or the curriculum tests. It reports on teacher effectiveness based on changes in all students taking a particular test. It reports on teacher effectiveness on all classes being taught by a specific teacher. It reports on subject retention of all students. It also reports on overall school effectiveness b comparison of grades or changes in student learning.

This report and printing module preferably includes automatic features. The module also automatically gathers information for periodic performance updating. The tests will be printed for each individual student with their own barcode identification. Student/Teacher effectiveness reports will be automatically compiled and then printed on demand.

In a preferred embodiment, the profiling module for the student is based on a best answer criterion. The factors that are tested may include a wide variety of cultural, aptitude, intellectual, academic, behavioral, and psychological factors. The testing, questions can also be simplified based on standardized methods due to academic or institutional preferences.

In another preferred embodiment, the profiling module will be developed for age groups from the fourth to the sixth grades. Additionally, update tests are preferably given 3 to 4 times a year. In another preferred embodiment, the profiling module will be developed for age groups front the kindergarten to the twelfth grades. In another preferred embodiment, the profiling module will be developed for age groups at the college level.)

The profiling module
a) Establishes the profiling criteria
b) Contains validation criteria
c) Provides for reliability checking
d) Establishes the base from which all tests are graded
e) Questions may be based on 'best answer' scenario or on essay testing
f) Utilizes algorithmic functions based on a fuzzy logic model, or other statistical modeling The profiling module is the heart of the system. It profiles each student for his or her innate and cognitive abilities, and aptitude. Learning behavior, language conversion, and predictive analysis may also be incorporated. Curriculum progress tests are balanced against the student's profile. Additionally, tests may be based partly on expertise in: job/profession testing, behavior, gender, personality, career, and culture testing.

Recognized tests that are currently known in the art that would be useful in the profiling module are show Table 2.

TABLE 2

Profiling Tests

Academic Achievement Assessments

1. Test of Academic Achievement Skills - Revised [TAAS-R]
2. Diagnostic Achievement Battery-3 [DAB-3]
3. Kaufman Assessment Battery for Children - Second Edition [KABC-II]
4. School Motivation and Learning Strategies Inventory [SMALSI]
5. Wide Range Achievement Test-3 [WRAT-3]
6. Young Children's Achievement Test [YCAT]

Arithmetic Assessments

1. Comprehensive Mathematical Abilities Test [CMAT]
2. Test of Early Mathematics Ability - Third Edition [TEMA-3]
3. Test of Mathematical Abilities - Second Edition [TOMA-2]

Cognitive Assessments

1. Cognitive (Intelligence) Test: nonverbal [C(I)T:nv]
2. Comprehensive Test of Nonverbal Intelligence [CTONI]
3. Detroit Tests of Learning Aptitude - Fourth Edition [DTLA-4]
4. Detroit Tests of Learning Aptitude - Primary - Third Edition [DTLA-P:3]
5. Draw-a-Person Intellectual Ability Test for Children [DAP:IQ]
6. Kaufman Brief Intelligence Test - Second Edition [K-BIT-2]
7. Slosson Intelligence Test - Revised [SIT-R3]
8. Test of Nonverbal Intelligence - Third Edition [TONI-3]

Emotional and Conduct Assessments

1. Asperger Syndrome Diagnostic Scale [ASDS]
2. Autism Screening Instrument for Educational Planning - Second Edition [ASIEP-2]
3. Burks Behavior Rating Scales - Second Edition [BBRS-2]
4. Behavioral and Emotional Rating Scale-Second Edition [BERS-2]
5. Childhood Autism Rating Scale [CARS]
6. Conners' Rating Scales - Revised [CRS-R]
7. Culture Free Self-Esteem Inventories - Third Edition [CFSEI-3]
8. Differential Test of Conduct and Emotional Problems [DT/CEP]
9. Draw A Person: Screening Procedures for Emotional Disturbance [DAP:SPED]
10. Gilliam Autism Rating Scale - Second Edition [GARS-2]
11. Gilliam Asperger's Disorder Scale [GADS]
12. Krug Asperger's Disorder Index [KADI]
13. McGhee-Mangrum Inventory of School Adjustment [MISA]
14. Psychoeducational Profile - Third Edition [PEP-3]
15. Preschool and Kindergarten Behavior Scales - Second Edition [PKBS-2]
16. Social-Emotional Dimensional Scale - Second Edition [SEDS-2]

Information Processing

1. Ross Information Processing Assessment - Primary [RIPA-P]
2. Ross Information Processing Assessment - Second Edition [RIPA-2]

Memory & Learning Assessments

1. Developmental Assessment of Young Children [DAYC]
2. Learning Disabilities Diagnostic Inventory [LDDI]
3. Learning Efficiency Test - II [LET-II]
4. Quick Neurological Screening Test - II [QNST-II]
5. Test of Memory and Learning [TOMAL-2]

TABLE 2-continued

Profiling Tests

6. Wide Range Assessment of Memory and Learning - Second Edition [WRAML-2]

Readiness Assessments

1. Gardner Social (Maturity) Developmental Scale [GSDS]
2. Test of Kindergarten/First Grade Readiness Skills [TKFGRS]
3. Kaufman Survey of Early Academic and Language Skills [K-SEALS]
4. Light's Retention Scale - Revised [LRS-R]
5. Mullen Scales of Early Learning [Mullen]
6. Pre-Kindergarten Screen [PKS]
7. Screening Assessment for Gifted Elementary and Middle School Students - Second
8. Edition [SAGES-2]
9. Test of Preschool Early Literacy [TOPEL]

Reading Assessments

1. Test of Oral Reading and Comprehension Skills [TORCS]
2. Test of Silent Reading Skills [TSRS]
3. Decoding-Encoding Screener for Dyslexia [DESD]
4. Gray Diagnostic Reading Tests - Second Edition [GDRT-2]
5. Gray Oral Reading Tests - Fourth Edition [GORT-4]
6. Gray Silent Reading Test [GSRT]
7. Phonics-Based Reading Test [PRT]
8. Rapid Automatized Naming and Rapid Alternating Stimulus Tests [RAN/RAS]
9. Slosson Oral Reading Test - Revised [SORT-R3]
10. Test of Early Reading Ability - Third Edition [TERA-3]
11. Test of Silent Contextual Reading Fluency [TOSCRF]
12. Test of Silent Word Reading Fluency [TOSWRF]
13. Test of Word Reading Efficiency [TOWRE]
14. Word Identification and Spelling Test [WIST]

Remedial Activities

1. Auditory Reasoning and Processing Remedial Activities [ARPRA]
2. Handwriting Development Remedial Activities [HDRA]
3. Spatial Orientation & Sequencing Development Remedial Activities [SOSDRA]
4. Visual-Motor Development Remedial Activities [VMDRA]
5. Visual-Motor Upper Level Remedial Activities [VMULRA]
6. Visual-Perceptual Remedial Activities [VPRA]
7. Visual-Perceptual Upper Level Remedial Activities [VPULRA]

Articulation Stories

1. Articulation Tales: Stories for Articulation Remediation
2. The Boone Voice Program For Children - Second Edition
3. Lindamood Phoneme Sequencing - Program for Reading, Spelling, and Speech [LIPS]
4. Peabody Articulation Decks [PAD]
5. Phonological Awareness Training for Reading [PATR]
6. Picture File
7. Question Cognition [QC]
8. Vocabulary As You Need It

Speech/Language Assessments

1. Test of Auditory-Perceptual Skills - Revised [TAPS-R]
2. Test of Auditory Processing Skills - 3rd Edition [TAPS-3]
3. Test of Auditory-Perceptual Skills - Upper Level [TAPS-UL]
4. Test of Auditory Reasoning and Processing Skills [TARPS]
5. Test of Grammatical and Syntactical Skills [TGSS]
6. Auditory Processing Abilities Test [APAT]
7. Arizona Articulation Proficiency Scale - Third Revision [Arizona-3]
8. Bankson Language Test-2 [BLT-2]
9. Carolina Picture Vocabulary Test [CPVT]
10. Comprehensive Receptive & Expressive Vocabulary Test - Second Edition [CREVT-2]
11. Comprehensive Test of Phonological Processing [CTOPP]
12. Expressive One-Word Picture Vocabulary Test - 2000 Edition [EOWPVT]
13. Fluharty Preschool Speech and Language Screening Test - Second Edition [Fluharty-2]
14. Goldman-Fristoe Test of Articulation - Second Edition [GFTA-2]
15. Hodson Assessment of Phonological Patterns - Third Edition [HAPP-3]
16. Illinois Test of Psycholinguistic Abilities - Third Edition [ITPA-3]
17. Khan-Lewis Phonological Analysis - Second Edition [KLPA-2]
18. Kindergarten Language Screening Test - Second Edition [KLST-2]

TABLE 2-continued

Profiling Tests

19. Lindamood-Bell Auditory Conceptualization Test - Third Edition [LAC-3]
20. Oral Speech Mechanism Screening Examination - Third Edition [OSMSE-3]
21. OWLS Written Expression Scale
22. OWLS Listening Comprehension Scale (LCS) and Oral Expression Scale (OES)
23. Photo Articulation Test - Third Edition [PAT-3]
24. Pragmatic Language Skills Inventory [PLSI]
25. Preschool Language Assessment Instrument - Second Edition [PLAI-2]
26. Receptive One-Word Picture Vocabulary Test - 2000 Edition [ROWPVT]
27. Receptive-Expressive Emergent Language Test - Third Edition [REEL-3]
28. Stuttering Severity Instrument for Children and Adults - Third Edition [SSI-3]
29. Test of Auditory Comprehension of Language - Third Edition [TACL-3]
30. Test of Adolescent and Adult Language - Fourth Edition [TOAL-4]
31. Test of Early Language Development - Third Edition [TELD-3]
32. Test of Language Development - Intermediate: Third Edition [TOLD-I:3]
33. Test of Language Development - Primary: Third Edition [TOLD-P:3]
34. Test of Narrative Language [TNL]
35. Test of Phonological Awareness Skills [TOPAS]
36. Test of Phonological Awareness - Second Edition: PLUS [TOPA-2+]
37. Test of Pragmatic Language [TOPL]
38. Test of Word Finding - Second Edition [TWF-2]
39. Token Test for Children - Second Edition [TTFC-2]
40. Utah Test of Language Development - Fourth Edition [UTLD-4]

Spelling Assessments

1. Test of Written Spelling - Fourth Edition [TWS-4]
2. Word Identification and Spelling Test [WIST]
3. Visual-Motor (Neuro-Sensory) Assessments
4. Test of Pictures/Forms/Letters/Numbers Spatial Orientation & Sequencing Skills
5. [TPFLNSOSS]
6. Test of Visual-Motor Skills - Revised [TVMS-R]
7. Test of Visual-Motor Skills - Revised (Alternate Scoring Method) [TVMS-R (ASM)]
8. Test of Visual-Motor Skills: (Upper Level) Adolescents and Adult [TVMS-UL]
9. Bruininks-Oseretsky Test of Motor Proficiency - Second Edition [BOT-2]
10. DeGangi-Berk Test of Sensory Integration [TSI]
11. Beery-Buktenica Developmental Test of Visual-Motor Integration - Fifth Edition
12. [Beery VMI-5]
13. Full Range Test of Visual Motor Integration [FRTVMI]
14. Jordan Left-Right Reversal Test - Revised [JLRRT-R]
15. Koppitz Developmental Scoring System for the Bender Gestalt Test - Second Edition
16. WITH Bender Cards [KOPPITZ-2]
17. Peabody Development Motor Scales - Second Edition [PDMS-2]
18. Test of Gross Motor Development - Second Edition [TGMD-2]
19. Test of Handwriting Skills - Revised [THS-R]
20. Visual Skills Appraisal [VSA]

Visual Perception Assessments

1. Test of Visual-Reasoning and Processing Skills [TVRPS]
2. Test of Pictures/Forms/Letters/Numbers Spatial Orientation & Sequencing Skills
3. [TPFLNSOSS]
4. Developmental Test of Visual Perception - Adolescent and Adult [DTVP-A]
5. Developmental Test of Visual Perception - Second Edition [DTVP-2]
6. Motor-Free Visual Perception Test - Third Edition [MVPT-3]
7. Test of Visual Perceptual Skills - Third Edition [TVPS-3]

Writing Assessments

1. Test of Early Written Language - Second Edition [TEWL-2]
2. Test of Written Language - Third Edition [TOWL-3]

The above referenced test are only examples for illustration. Other tests may be used that are known in the art that would measure educational, sociological, and psychological factors which pertain to human learning. Some tests have overlapping results in different areas as their tests have implications in different fields.

Educational testing factors include:
1. Academic Achievement Assessments
2. Arithmetic Assessments
3. Articulation Stories
4. Information Processing
5. Memory and Learning Assessments
6. Language Assessments; Including Spelling, Grammar, Writing, and Foreign Language Assessments
   Sociological testing factors include:
1. Emotional and Conduct Assessments
2. Readiness Assessments
3. Speech and Language Assessments
   Psychological testing factors include:
1. Cognitive Assessments
2. Emotional and Conduct Assessments
3. Remedial Activities
4. Speech and Language Assessments
5. Visual Perception Assessments There are two different types of testing, the Profile testing and the Curriculum testing. The profile testing is used to determine the innate and cognitive ability of the student. The curriculum testing is the testing done on the class work or course work and is the test for which the student will receive the letter or numerical grade.

In a preferred embodiment, the student's profile may be updated to a small part based on the curriculum testing as the student acquires skills and grows older. In a preferred embodiment, the profile is updated after a student takes a curriculum test, and the students profile is updated after the student receives a grade on a curriculum test.

In a preferred embodiment, the profile testing for the students profile would include testing for:

| | |
|---|---|
| Part (A) Age appropriate Database | Score a |
| Part (B) Cognitive Abilities | Score b |
| Part (C) Aptitude | Score c |
| Base Score Factor | Profile Rating d |

Part (A) questions will test overall knowledge in each field of study against age appropriate data and render a score.

Part (B) questions will test the cognitive ability of the student in each subject and renders a score.

Part (C) questions cover the aptitude of the student for each subject and renders a score.

The cumulative scores provide the final profile, rating. Other built in factors are: validity and reliability check questions. Student consistency check questions may be used. The base score factor may be an average or weighted average of scores a, b, and c.

In a preferred embodiment, Curriculum Testing would include ongoing periodic course tests on current studies administered by the teacher or administration at their discretion. The curriculum test would preferably comprise:

| | |
|---|---|
| Results matched against students profile for grade | Score e |
| Profile may be upgraded to match ongoing efforts | Score f |
| Test Grade | Grade g |

These tests are given as part of the normal teaching efforts, and provide the grade for the student. These tests are part of the normal coursework but are graded against the student's profile.

In the current grading system, it is normal for a student's grade to be established based on the percentage of correct answers based on a 100% system:

TABLE 1

| | | | | | | | |
|---|---|---|---|---|---|---|---|
| 100-97 | A+ | 89-87 | B+ | 79-77 | C+ | 69-67 | D+ |
| 96-93 | A | 86-83 | B | 76-73 | C | 66-63 | D |
| 92-90 | A− | 82-80 | B− | 72-70 | C− | 62-60 | D− |
| | | | Below 60 Fail | | | | |

Table 1, or a similar grading system is well known. It is also common for a letter grade to be established based on a class average. That is, the average score for the class is assigned a nominal letter grade of a C for perhaps a B, a C+ or some other grade) and all other students are graded based on their score relative to the average score.

The present invention does not utilize the method of grading based on averaging the test scores of the class.

In the preferred embodiment, the actual methodology whereby the actual student letter grade, or numerical grade, is determined for any particular curriculum test is meant to be flexible based on the dynamic nature of the databases involved. The student profile tests are assigned various numerical values, and those values are optionally weighted, based on statistical methods which are correlated to student academic, vocational, or other tested performance. Those assigned numerical values are then used to develop grading scales, which may or may not be linear, which are then applied to develop grading scales to determine letter grades for a particular test. Letter grades are only one embodiment of the present invention for those educational systems that desire to maintain continuity with previous well known, accepted, and understood systems. Numerical grades, pass/fail grades, and other kinds of grading are also embodiments of the present invention.

In a preferred embodiment, the methodology just described varies by subject. In another preferred embodiment, the methodology just described varies for each test.

In another embodiment, the letter grade is based on the student's percentage of correct answers and a letter grade is assigned based on an adjusted range which is established based on the student's current profile. The profile may establish a different grade range for each type of test. If a student is innately better at math than at English, the test score needed for a better grade will be higher for math than English.

In another embodiment, the individual questions may be structured such that the student answers and the letter grade is developed based on the individual questions rather than an overall numerical number of correct answers answered out of a total.

Alternately, in a simple embodiment of the present invention, the grading scale in Table 1 is modified based on a student's profile to determine a letter grade.

Even though distinct modules are illustrated in FIG. 1, this is not meant to be restrictive in anyway from a programming standpoint. Functionally equivalent programs could be created with only one main module, combination of several modules, or breaking down further into smaller program pieces as would be readily apparent to those skilled in the art.

Figure 2:
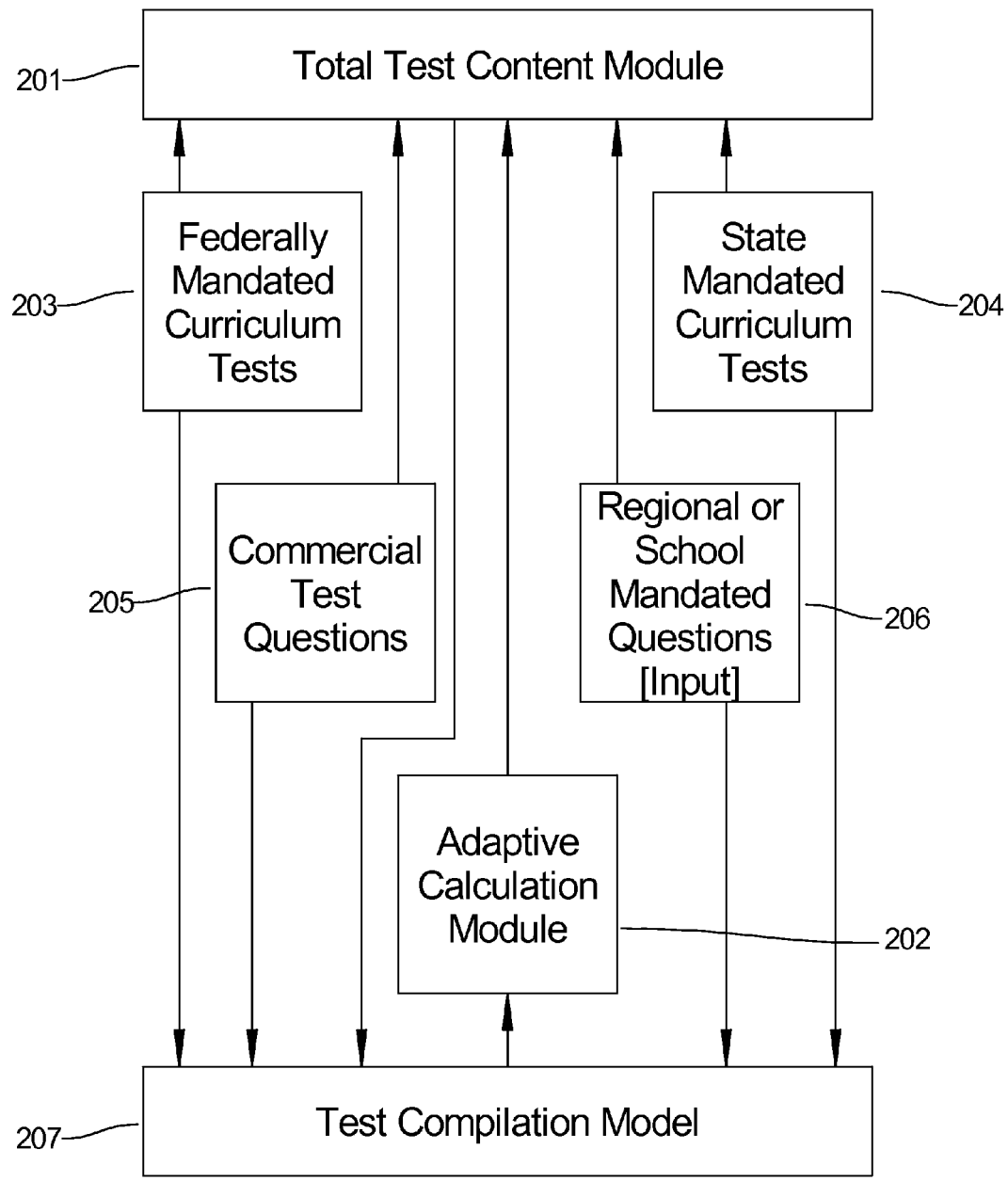
FIG. 2 shows a student age information database.

FIG. 2 shows the Student—Age Information Database It comprises:

A Total Test Content Module 201. This module or database is cumulative content of all test information on each subject being taught to include prescribed content from Federal, State, and Commercial curriculum databases.

An Adaptive Calculation Module 202. This calculation module will draw from national, local and current age response information to establish range for age appropriate establishment of content.

Federally Mandated Curriculum Tests 203. These tests contain content guidelines under Federal mandates to be factored into the selection of test items.

State Mandated Curriculum Tests 204. These tests contain content guidelines for each State to be factored into the selection of test items based on student's state of residence.

Commercial Test Questions 205. This module will contain commercial test questions and standards that can be selected by those schools utilizing their curriculums.

Regional or School Mandated Questions 206. These mandated questions may be selected when preparing tests as required by individual schools to meet ethnic, religious, home-schooling requirements, etc.

Figure 3:
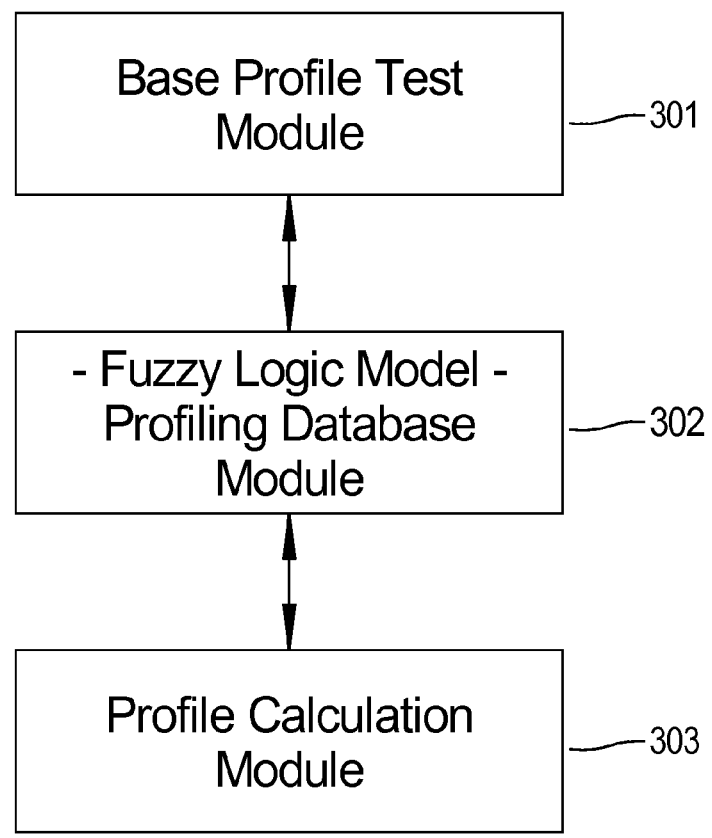
FIG. 3 shows a student profile processing module.

Test Compilation Model 207. Tests are compiled base on:
a. The individual student by name (will contain other pertinent data on student)
b. The student's age. (may contain other personal information affecting learning)
c. Test area (discipline: math, science etc.)
d. Type of test:
  i. Profile Update test
  ii. Curriculum test FIG. 3 shows the student profile processing, module. It comprises:

A Base Profile Test Module 301, This Base Profile Testing Module constructs the three or four core profiling, tests to establish that baseline for each student. The test draws from: Age appropriate database 202, and certain parts of the Profile Calculation Module 303.

Profiling Database Module 302. This module contains multi-discipline (socio-economics, psychology, cognitive and innate testing, etc, information built around a Fuzzy Logic modeling system, or other statistical model. Items will include: Learning behavior, Attitude, Temperament, etc. to provide depth. The proven tests and methods from the various disciplines in learning will provide the base for this section. The results will serve as part of the factors that go into the final individual student baseline. Student validity and reliability factors will be embedded within the test.

Calculations done in this module include:
The baseline for each student, by subject, is to some degree calculated:
1. On the total extent of content information available, by subject, in relation to the amount of test questions presented correlated with the correct answers.
2. The value from the results of the Innate and Cognitive testing portions of the tests.
3. Correlating factors of other aspects utilized in any given test or type of test.

The baseline is constantly changing with the student and the most recent test is factored against the last know profile score of that student. The baseline changes due to:
1. Updating from some portions of ongoing curriculum testing activities.
2. Updated from core profiling tests.

Profile Calculation Module 303. This module:
1. Calculates and rates questions from the general age appropriate database.
2. Provides calculations from the historical testing activity of the student.
3. Calculates results of periodic testing.
4. Calculates current test results against the above three calculations to assign a grade or result factor.

Figure 4:
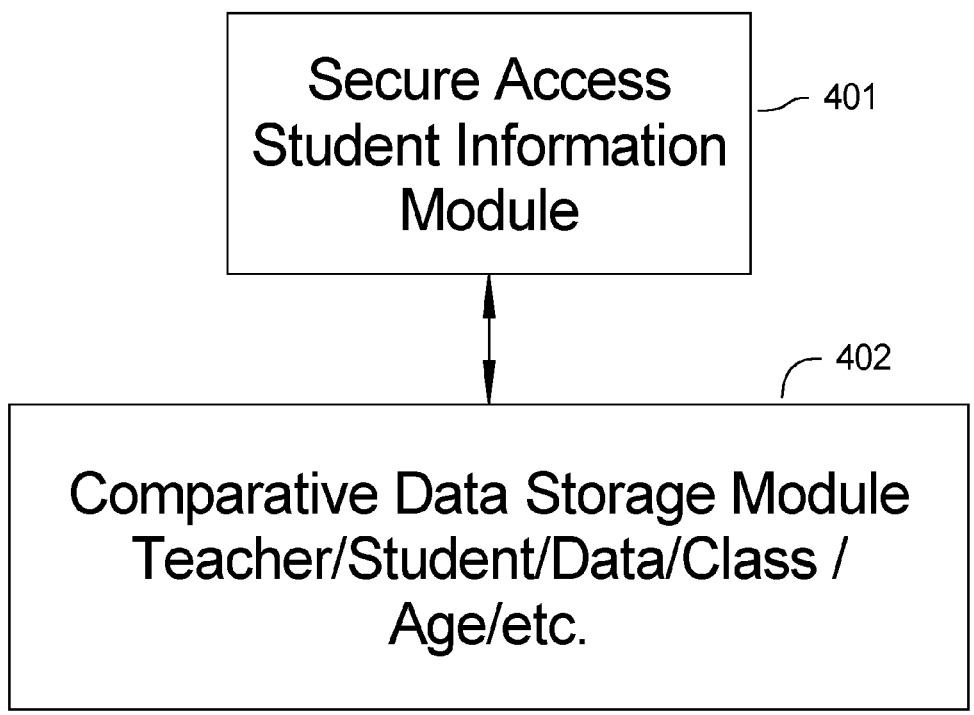
FIG. 4 shows a results database.

The Results Database is shown in FIG. 4. It contains:
The Student Information Module 401. This is a secure database containing:
1. Student IDs
2. Student information
3. Profile Factors as captured from the Student Profile Processing Module
4. Student test Results Comparative Data. Storage Module 402. It comprises:
1. Class test results with comprehension effectiveness charts
2. Individual and class student teaching effectiveness chart
3. Teacher effectiveness
4. Other comparative data will be calculated as requested through the Test Report & Print Module.

This database is not accessible by anyone and only those factors that are allowably requested through the test report module can be read.

Figure 5:
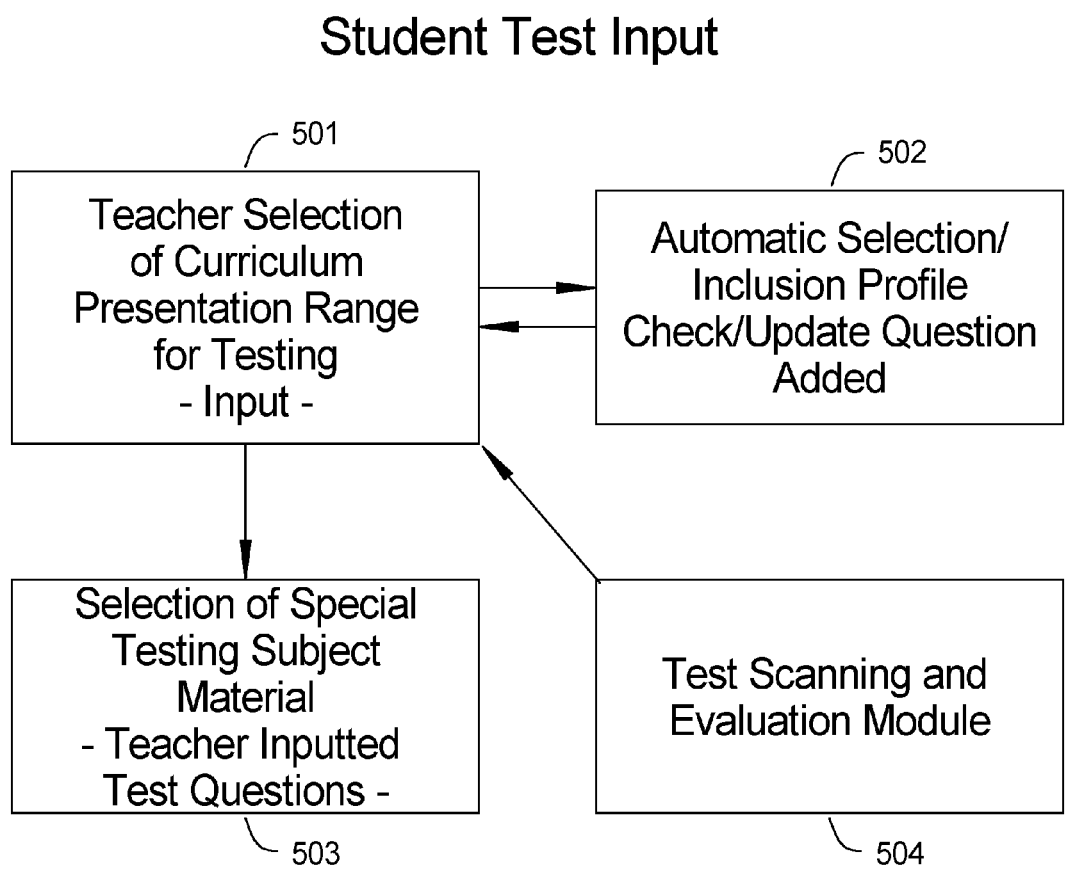
FIG. 5 shows a student test input.

FIG. 5 shows the Student Test Input. It contains:
Teacher Selection of Curriculum 501. This provides the teacher with the ability to select for automated preparation by ranging the curriculum presented from which the computer will draw the desired test questions.

Automatic Selection/Inclusion Profile 502. The test questions will be drawn from the appropriate databases along with profile update questions not at teacher's discretion.

Selection of Special Testing Subject Material 503. This is to allow personalized testing against the student's profile. The teacher will write the test questions but they will not be stored in the main database. This will also generate questions for testing.

Test Scanning and Evaluation Module 504. This module contains scanning routines for input and recording of test results.

Figure 6:
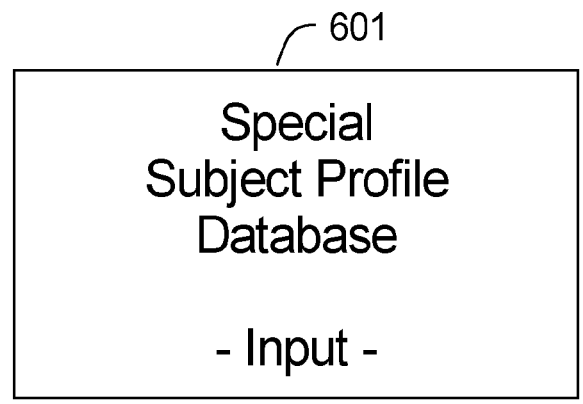
FIG. 6 shows a teacher curriculum module.

FIG. 6 shows the Teacher Curriculum Module. It contains:
Special Subject Profile Database 601. This module will allow for specialized profiling and can be included in the Profile Evaluation Series of testing with segregated result reporting. This will allow for special courses, religion, etc.

Figure 7:
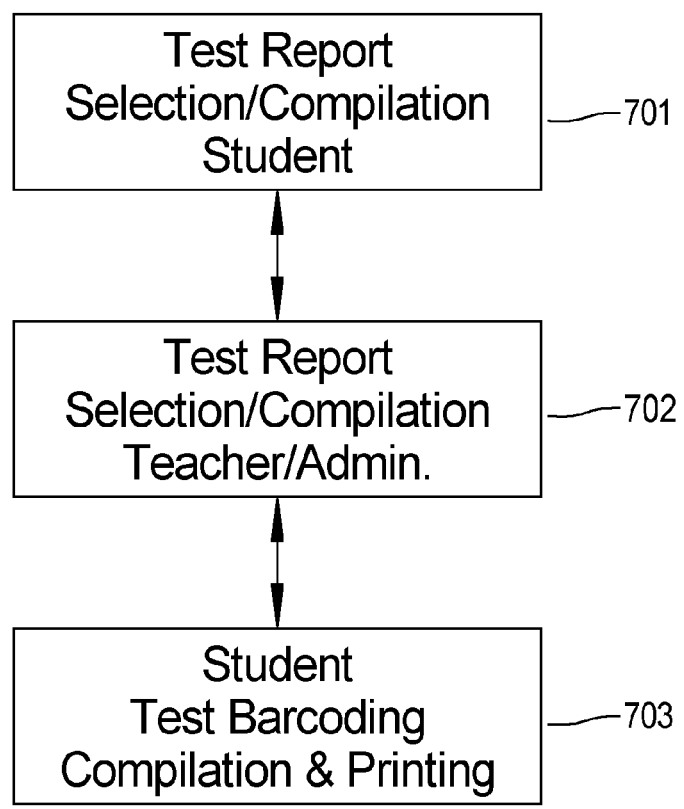
FIG. 7 shows a test report and printing module.

FIG. 7 shows the Test Report and Printing Module. It contains:
Test Report Selection Compilation thy Student) Module 701. This module allows for reporting on student/teacher/class report generator. This section also provides printouts on student grades.

Test Report Selection Compilation (by Teacher/Admin) Module 702. This report generator provides teacher and administration evaluation reports.

Test Report Selection Compilation (by Student) Module 703. This module collates test questions for all tests, matches to student ID with bar coding type identification, and physically generates tests for paper or electronic printing.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. A computer-implemented method for providing student profile grading for a group of students, comprising:
   presenting an interface linked to a computer memory device to collect, and store student specific data for a student from the group of students;
   processing the student specific data for the student with the computer to establish a personal student profile comprising an individual characterization of an innate and cognizant ability for the student in a field of study;
   generating a test reference base for the student to determine an expected performance level for the student in the field of study based on the established individual characterization in the field of study;
   presenting an interface linked to the computer to obtain a curriculum test result for the student in the field of study;
   storing the test reference base and the curriculum test result for the student on the memory device: and
   processing the stored test reference base and curriculum test result for the student with the computer to calculate a grade for the student, wherein the grade for the student is determined by comparing the curriculum test result to the test reference base to determine how well the student performed in relation to the expected performance level in the field of study.

2. A computer-implemented method according to claim 1, wherein the individual characterization of the innate and cognizant ability for the student comprises:
   an age appropriate criteria score corresponding to a range of age appropriate content; and
   a composition of profile tests taken by the student comprising:
      a cognitive ability score for the student in the field of study; and
      an aptitude score for the student in the field of study.

3. A computer-implemented method according to claim 2, wherein the composition of profile tests further comprises at least one of educational testing factors, sociological testing factors, and psychological testing factors.

4. A computer-implemented method according to claim 2, wherein generating the test reference base comprises:
   assigning a weighted factor to the cognitive ability score;
   assigning a weighted factor to the aptitude score; and
   compiling the age appropriate criteria score with the weighted cognitive ability and aptitude scores to calculate a base factor score.

5. A computer-implemented method according to claim 4, wherein the base factor score is used to generate a grading scale individual to the student in the field of study for comparing the curriculum test result to the test reference base.

6. A computer-implemented method according to claim 1, further comprising updating the personal student profile for the student at predetermined intervals.

7. A computer-implemented method according to claim 1, further comprising performing a reliability check on the personal student profile when the grade is calculated.

8. A computer-implemented method according to claim, further comprising:
   processing the student specific data for the student with the computer to establish within the personal student profile a second individual characterization of an innate and cognizant ability for the student in a second field of study;
   generating a second test reference base for the student to determine a second expected performance level for the student in the second field of study based on the established second individual characterization;
   obtaining a second curriculum test result for the student in the second field of study, storing the second test reference base and the second curriculum test result for the student on the memory device; and
   processing the stored second test reference base and second curriculum test result for the student with the computer to calculate a second grade for the student, wherein the second grade for the student is determined by comparing the second curriculum test result to the second test reference base to determine how well the student performed in relation to the second expected performance level in the second field of study.

9. A computer-implemented student profile grading apparatus for a group of students, comprising:
   a results database configured to store a curriculum test result in a field of study for a student from within the group of students; and
   a student profiling processing module linked to the results database and configured to:
      establish a personal student profile for the student, wherein the personal student profile comprises an individual characterization of an innate and cognizant ability for the student in the field of study;
      generate a test reference base for the student comprising an expected performance level for the student in the field of study, wherein the test reference base is based on the established individual characterization in the field of study; and
      process the test reference base and the curriculum test result for the student to calculate a grade for the student, wherein the grade for the student is determined by comparing the curriculum test result to the test reference base to determine how well the student performed in relation to the expected performance level in the field of study.

10. A computer-implemented student profile grading apparatus according to claim 9, wherein the individual characterization of the innate and cognizant ability for the student comprises:
    an age appropriate criteria score corresponding to a range of age appropriate content; and
    a composition of profile tests taken by the student comprising:
       a cognitive ability score for the student in the field of study; and
       an aptitude score for the student in the field of study.

11. A computer-implemented student profile grading apparatus according to claim 10, wherein the composition of profile tests further comprises at least one of: educational testing factors, sociological testing factors, and psychological testing factors.

12. A computer-implemented student profile grading apparatus according to claim 10, wherein the test reference base comprises:
    a weighted factor applied to the cognitive ability score;
    a weighted factor applied to the aptitude score; and
    a statistical compilation of the age appropriate criteria score with the weighted cognitive ability and aptitude scores to calculate a base factor score.

13. A computer-implemented student profile grading apparatus according to claim 12, wherein the base factor score is used to generate a grading scale individual to the student in the field of study for comparing the curriculum test result to the test reference base.

14. A computer-implemented student profile grading apparatus according to claim 9, wherein the student profiling processing module is further configured to update the personal student profile of the student at predetermined intervals.

15. A computer-implemented student profile grading apparatus according to claim 9, further comprising, performing a reliability check on the personal student profile when the grade is calculated.

16. A computer-implemented student profile grading, apparatus according to claim 10, wherein:
the results database is further configured to store a second curriculum test result for the student in the second field of study; and
the student profiling processing module is further configured to:
establish within the personal student profile a second individual characterization of an innate and cognizant ability for the student in the second field of study; and
generate a second test reference base for the student comprising a second expected performance level for the student in the second field of study, wherein the second test reference is based on the established individual characterization in the second field of study; and
process second test reference base and second curriculum test result for the student to calculate a second grade for the student, wherein the second grade for the student is determined by comparing the second curriculum test result to the second test reference base to determine how well the student performed in relation to the expected performance level in the second field of study.

17. A non-transitory computer-readable medium containing instructions stored thereon for causing a computer having a processor and a memory device to perform a method for providing student profile grading for a group of students, comprising:
presenting an interface linked to a computer memory device to collect and store student specific data for a student from the group of students;
processing the student specific data for the student with the computer to establish a personal student profile comprising, an individual characterization of an innate and cognizant ability for the student in a field of study;
generating a test reference base for the student to determine an expected performance level for the student in the field of study based on the established individual characterization in the field of study;
presenting an interface linked to the computer to obtain a curriculum test result for the student in the field of study;
storing the test reference base and the curriculum test result for the student on the memory device; and
processing the stored test reference base and curriculum test result for the student with the computer to calculate a grade for the student, wherein the grade for the student is determined by comparing the curriculum test result to the test reference base to determine how well the student performed in relation to the expected performance level in the field of study.

18. A non-transitory computer-readable medium according to claim 17, wherein the individual characterization of the innate and cognizant ability for the student comprises:
an age appropriate criteria score corresponding to a range of age appropriate content; and
a composition of profile tests taken by the student comprising:
a cognitive ability score for the student in the field of study: and
an aptitude score for the student in the field of study.

19. A non-transitory computer-readable medium according to claim 18, wherein generating the test reference base comprises:
assigning a weighted factor to the cognitive ability score;
assigning a weighted factor to the aptitude score; and
compiling the age appropriate criteria score with the weighted cognitive ability and aptitude scores to calculate a base factor score used to generate a grading, scale individual to the student in the field of study for comparing the curriculum test result to the test reference base.

20. A non-transitory computer-readable medium according to claim 17, further comprising:
updating the personal student profile for each student at predetermined intervals; and
performing a reliability check on the personal student profile when the grade is calculated.

21. A non-transitory computer-readable medium according to claim 17, further comprising:
processing the student specific data for the student with the computer to establish within the personal student profile a second individual characterization of an innate and cognizant ability for the student in a second field of study;
generating a second test reference base for the student to determine a second expected performance level for the student in the second field of study based on the established second individual characterization;
obtaining a second curriculum test result for the student in the second field of study;
storing the second test reference base and the second curriculum test result for the student on the memory device; and
processing the stored second test reference base and second curriculum test result for the student with the computer to calculate a second grade for the student, wherein the second grade for the student is determined by comparing the second curriculum test result to the second test reference base to determine bow well the student performed in relation to the second expected performance level in the second field of study.

* * * * *

UNITED STATES PATENT AND TRADEMARK OFFICE
CERTIFICATE OF CORRECTION

PATENT NO. : 8,864,499 B2  Page 1 of 1
APPLICATION NO. : 13/890691
DATED : October 21, 2014
INVENTOR(S) : Patrick G. Roers It is certified that error appears in the above-identified patent and that said Letters Patent is hereby corrected as shown below:

In the Claims

In column 13, line 57, please add the number "1" after the word "claim".

In column 14, line 2, after the word "study" please delete the "," and insert --;--.

Signed and Sealed this
Third Day of February, 2015

Michelle K. Lee
*Deputy Director of the United States Patent and Trademark Office*